United States Patent [19]

Tanaka et al.

[11] Patent Number: 4,729,222

[45] Date of Patent: Mar. 8, 1988

[54] BRAKE CIRCUIT APPARATUS FOR HYDRAULIC MOTOR

[75] Inventors: Hideaki Tanaka, Ibaraki; Toichi Hirata, Ushiku; Genroku Sugiyama, Ibaraki; Kuniaki Yoshida; Shinichi Mihara, both of Tsuchiura, all of Japan

[73] Assignee: Hitachi Construction Machinery Co., Ltd., Japan

[21] Appl. No.: 886,040

[22] Filed: Jul. 16, 1986

[30] Foreign Application Priority Data

Jul. 17, 1985 [JP] Japan .................... 60-155942

[51] Int. Cl.$^4$ .................................... F16D 31/02
[52] U.S. Cl. .................................... 60/436; 91/461
[58] Field of Search .................. 60/435, 436; 91/461

[56] References Cited

U.S. PATENT DOCUMENTS

| 4,100,973 | 7/1978 | Freudenthal . | |
|---|---|---|---|
| 4,317,331 | 3/1982 | Aruga et al. | 60/436 |
| 4,464,898 | 8/1984 | Aoyagi et al. | 60/436 |
| 4,557,109 | 12/1985 | Nagahara et al. | 60/436 |
| 4,571,941 | 2/1986 | Aoyagi et al. | 91/461 X |

OTHER PUBLICATIONS

European Search Report EP 86 10 9746 8/10/86.

*Primary Examiner*—William E. Wayner
*Attorney, Agent, or Firm*—Antonelli, Terry & Wands

[57] ABSTRACT

The brake circuit apparatus for a hydraulic motor in a hydraulic circuit system having at least one main hydraulic pump, a hydraulic motor driven by a hydraulic fluid supplied from the main pump and having a rotary shaft, and a directional control valve actuated by an operation device for control of flow rate and flow direction of the hydraulic fluid supplied to the hydraulic motor from the main pump. The hydraulic motor is provided with a mechanical brake device having a brake release cylinder adapted to release the rotary shaft of the motor from the braking by the mechanical brake device by supply of a hydraulic fluid to the brake release cylinder. The apparatus further has an auxiliary hydraulic pump and a control circuit connected to the auxiliary pump, brake release cylinder and reservoir for control of fluid communication therebetween. The control circuit includes a hydraulic fluid supply line for receiving a hydraulic fluid supplied from the auxiliary hydraulic pump, a first line connected between the hydraulic fluid supply line and the brake release cylinder, and a second line connected between the hydraulic fluid supply line and the reservoir.

14 Claims, 5 Drawing Figures

BRAKE CIRCUIT APPARATUS FOR HYDRAULIC MOTOR

BACKGROUND OF THE INVENTION

The present invention relates to a brake circuit apparatus for a hydraulic motor, and more particularly to a brake circuit apparatus for a hydraulic motor in a hydraulic circuit system of the construction machine such as a hydraulic excavator in which there is provided a mechanical brake device including a brake release cylinder adapted to release the rotary shaft of a hydraulic motor from the braking by the mechanical brake device by supply of hydraulic fluid to the brake release cylinder.

Figure 1:
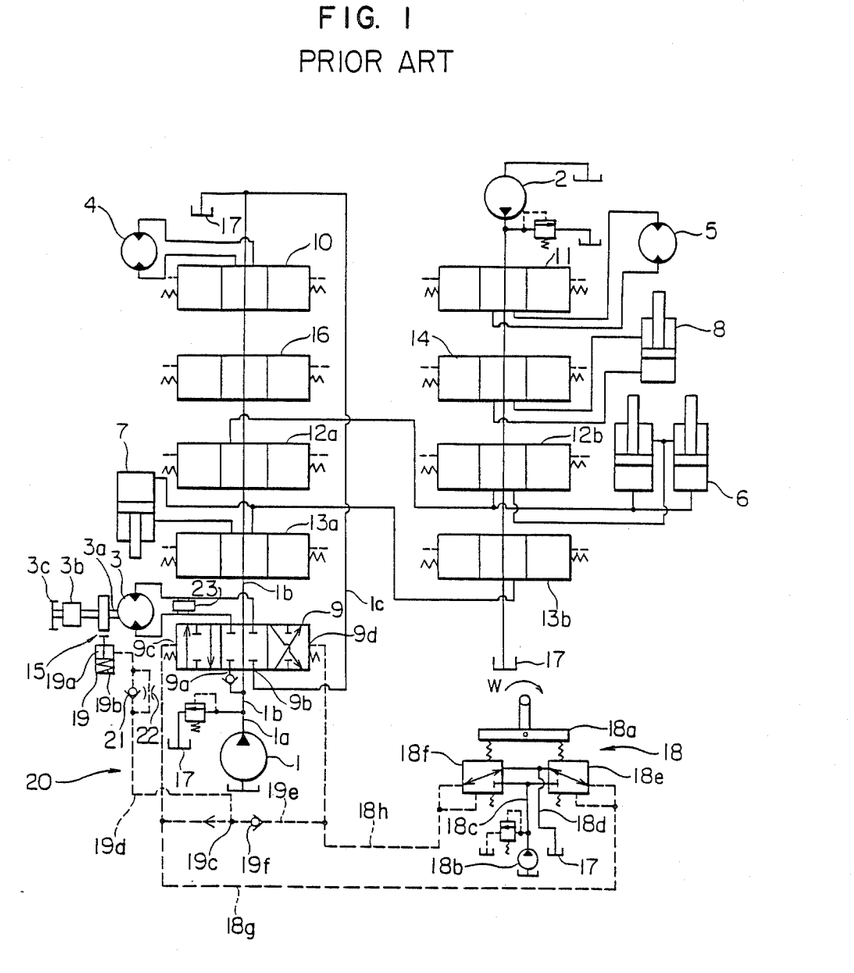
FIG. 1 is a schematic hydraulic circuit showing the conventional brake circuit apparatus for the swing hydraulic motor.

The brake circuit apparatus for a hydraulic motor has hitherto been known for example in a hydraulic circuit system for use in a hydraulic excavator. As shown in FIG. 1, the conventional brake circuit apparatus comprises main hydraulic pumps 1, 2, a swing hydraulic motor 3, for swing, hydraulic motors 4, 5 for left and right travels, hydraulic cylinders for front attachments, i.e., a boom cylinder 6, an arm cylinder 7 and a bucket cylinder 8, which are driven by hydraulic fluid supplied from the main pumps 1, 2, and directional control valves for these respective motors and cylinders for control of the flow rate and flow direction of hydraulic fluid supplied to the motors and cylinders from the main pumps, i.e., a directional control valve 9 for swing, directional control valves 10, 11 for left and right travels, first and second directional control valves 12a, 12b for boom, first and second directional control valves 13a, 13b for arm, and a directional control valve 14 for bucket, the swing hydraulic motor 3 being provided with a mechanical brake device 15 for braking its rotary shaft 3a. A provisional directional control valve 16 is also incorporated, in the circuit system. The main hydraulic pump 1 has its fluid supply line 1a connected through a center-bypass line 1b passing through the directional control valves 9, 13a, 12a, 16 and 10 to inlet ports 9a of those control valves (the inlet ports and their connections to the line 1b for those control valves other than the valve 9 are not shown for purposes of brevity), while the outlet ports 9b of these control valves are connected to a return line 1c (likewise, the outlet ports and their connections to the line 1b for those control valves other than the valve 9 are not shown), the center-bypass line 1b and return line 1c both being connected to a reservoir 17. Although not shown, the other directional control valves 11, 14, 12b and 13b are also connected to the main pump 2 and reservoir 17, in like manner. Between the directional control valve 9 and the swing motor 3 is interposed a relief valve unit 23, and it is to be noted that between the other control valves and their associated motors or cylinders are also provided similar respective relief valve units, not shown.

The swing control valve 9 is actuated by an operation device 18 which includes a control level 18a and two pilot valves 18e and 18f connected to a fluid supply line 18c extending from a pilot pump 18b and to a return line 18d leading to the reservoir 17, respectively, and adepted to be selectively actuated by the control lever 18a. Those pilot valves 18e and 18f are further connected to pilot-operated sections 9c and 9d of the swing valve 9 through pilot lines 18g, 18h, respectively. Although not shown, the other control valves 10, 11, 12a and 12b, 13a, 13b are likewise associated with similar operation devices.

The mechanical brake device 15 includes a brake release cylinder 19 for releasing the rotary shaft 3a of the swing hydraulic motor 3 from the braking thereby by supply of hydraulic fluid to the brake release cylinder, and the brake release cylinder 19 is connected through a line 19d to an outlet 19c of a shuttle valve 19f provided in a line 19e connected between the pilot lines 18g and 18h, thereby providing a brake circuit apparatus 20. In the line 19d, a check valve 21 and a restrictor 22 are connected in parallel with each other, the check valve 21 allowing fluid flow to be directed toward the brake release cylinder but prohibitting the same in the reverse direction.

The rotary shaft 3a of the swing motor 3 carries a driving gear 3c mounted through a speed reducer 3b in a known manner, the driving gear 3c being in meshing engagement with an internal gear of a swing frame, not shown.

In the above-mentioned hydraulic circuit system, the brake circuit apparatus 20 for the swing motor 3 operates as follows. When the swing control valve 9 is in its neutral position with the operation device 18 being inactivated, the fluid from the pump 1 flows downstream of the valve 9 through the fluid supply line 1a and center-bypass line 1b, and further, depending on the operating conditions assumed by the downstream control valves 13a, 12c and 10, it flows either directly to the reservoir or to the reservoir 17 through the return line 1c after having actuated the cylinder or motor associated with the operated valve.

Assuming here that the control lever 18a of the operation device 18 is actuated in a direction shown at W in FIG. 1, a pilot pressure from the pilot pump 18b is transmitted to the line 18g through the pilot valve 18e, and it is further transmitted through the line 19e, shuttle valve 19f and its outlet 19c, line 19d, and check valve 21 to the cylinder chamber 19a of the brake release cylinder 19. Thus, against a force of the spring 19b, the pilot pressure acts to release the braking of the rotating shaft 3a of the motor 3, thereby rendering the motor 3 freely rotatable. Meanwhile, the pilot pressure transmitted through the pilot line 18g is applied to the pilot-operated section 9c of the directional control valve 9, so that the valve is shifted from neutral to the left side working position. This permits the hydraulic fluid discharged from the pump 1 to flow into the valve 9 through the supply line 1a, center-bypass line 1b and inlet port 9a, and then into the motor 3 while a return fluid from the motor 3 flows back into the valve 9 and then into the reservoir 17 through the outlet port 9b and return line 1c, thereby causing the hydraulic motor 3 to be activated.

When the control lever 18a is restored to its neutral position, the pilot valve 18e is brought into communication with the reservoir 17, thereby the pilot-operated section 9c of the control valve 9 as well as the pilot line 18g also being brought into communication with the reservoir 17. This causes the valve 9 to be shifted back to its neutral position. Instantaneously, the pressure in the line 19d is caused to reduce, and the pressure in the chamber 19a of the brake release cylinder 19 is also caused to reduce, so that the mechanical brake device 15 is actuated so as to brake the rotary shaft 3a of the motor 3. In this instance, however, the fluid within the cylinder chamber 19a is forced to flow through the restrictor 22 since it is not permitted to flow through the check valve 21. This implies that the pressure reduction within the chamber 19a takes time. During this period, the directional control valve 9 closes its outlet port 9b, and the hydraulic motor 3 stops its rotation as a result of being hydraulically braked. Then the rotary shaft 3a of the motor 3 is locked or breaked by the mechanical brake device 15.

In the brake circuit apparatus as described above, when the operation device 18 is actuated to shift the directional control valve 9 for actuation of the motor 3, there involves the necessity of initiating rotation of the motor 3 after having released the braking by the mechanical brake device 15, since transmission of the torque of the motor 3 to the mechanical brake device 15 may result in reduction of serviceable life of the mechanical brake device.

According to the conventional brake circuit apparatus, however, the pilot pressure as an output of the pilot valve 18e or 18f is commonly used for operation of the brake release cylinder 19 and for shifting of the directional control valve 9 while the shuttle valve 19b is additionally provided in the line leading to the release cylinder 19, and this arises a time lag between the establishment of pilot pressure and the actual release of the braking by the mechanical brake device by supply of a fluid flow rate necessary for actuation of the brake release cylinder 19 after the established pilot pressure has been transmitted to the cylinder 19. Further, the pilot pressure being established is proportional in magnitude to the extent of stroke of the actuated operation device 18, and therefore when the extent of stroke of the operation device is small, the pilot pressure as established is also small correspondingly, and this has resulted in furtherance of the above-described time lag. Thus, the problem has been frequently encountered in that the motor 3 initiates rotation before the braking by the mechanical brake device 15 is fully released.

In the conventional hydraulic brake apparatus for the swing hydraulic motor, as described so far, when the operation device 18 for the swing motor 3 is actuated, the rotary shaft 3a of the motor 3 is released from the braking by the mechanical brake device, enabling rotation of the motor 3. However, since the operation devices, not shown, associated with the other cylinders and motors 4 to 8 are not associated with the brake circuit apparatus 20 at all. The braking of the shaft 3a of the motor 3 is not released even if those operation devices are actuated. This may cause the following inconvenience. The operations performed by the hydraulic excavator involve an excavating operation in which only operations of the front attachments, i.e., boom, arm and bucket are required. During such excavating operation, it may happen that the side faces of the bucket is turusted by soil being excavated or the hydraulic excavator is operated particularly in a sloping terrain, so that the swing frame of the excavator is objectionably acted upon by an swing force due to the thrusting or the rotational moment caused by the weights of the front attachments. Under such circumstances, the result is that since the braking of the rotary shaft of the swing motor is not released, the swing force must be taken up or borne by both a relief torque caused by the relief valve unit 23 for the swing motor 3 and the braking force of the mechanical brake device 15. This causes an excessive load applied to the speed reducer 3b disposed between the driving gear 3c in meshing engagement with the internal gear of the swing frame and the mechanical brake device 15, which may possibly reduce its durability.

Accordingly, an object of the present invention is to provide a hydraulic brake apparatus for a hydraulic motor which is capable of effecting positive release of the braking by a mechanical brake device before the hydraulic motor starts its rotation.

A further object of the invention is to provide a hydraulic brake apparatus for a swing hydraylic motor in a hydraylic circuit system of the construction machine which is capable of preventing an excessive load from being applied to the speed reducer for the swing hydraulic motor in the operation in which only operations of the front attachments are required and the operation of the swing frame is not required, so that the durability is not reduced.

SUMMARY OF THE INVENTION

According to one aspect of the invention, there is provided a brake circuit apparatus for a hydraulic motor in a hydraulic circuit system including at least one main hydraulic pump, a hydraulic motor driven by a hydraulic fluid supplied from said main pump and having a rotary shaft, and a directional control valve actuated by operation means for control of flow rate and flow direction of the hydraulic fluid supplied to said hydraulic motor from said main hydraulic pump, said hydraulic motor being provided with mechanical brake means having a brake release cylinder adapted to release the rotary shaft of the motor from the braking by the mechanical brake means by supply of a hydraulic fluid to the brake release chamber; wherein: said apparatus comprises an auxiliary pump, and control circuit means connected to said auxiliary pump, said brake release cylinder and a reservoir for control of fluid communication therebetween, said control circuit means having a hydraulic fluid supply line for receiving a hydraulic fluid supplied from said auxiliary hydraulic pump, a first line connected between said hydraulic fluid supply line and said brake release cylinder, and a second line connected between said hydraulic fluid supply line and said reservoir, said second line being associated with said directional control valve such that when the control valve is in a neutral position, said hydraulic fluid supply line is brought into communication with said reservoir to thereby disable a hydraylic fluid from said hydraulic fluid supply line from being supplied to said brake release cylinder through said first line, while when said directional control valve is actuated, said communication is interrupted to thereby enable the hydraulic fluid from said hydraulic fluid supply line to be supplied to said brake release cylinder through said first line.

According to another aspect of the invention, there is provided a brake circuit apparatus for a hydraulic motor for a swing in a hydraulic circuit system of a construction machine including at least one main hydraulic pump, a hydraulic motor for swing hydraulic motors for left and right travels, and hydraulic cylinders for front attachments driven by hydraulic fluid supplied from said main pump, said swing motor having a rotary shaft, and directional control valves for said hydraulic motors and cylinders actuated by respective operation means for control of flow rate and flow direction of the hydraulic fluid supplied to said hydraulic motors and cylinders from said main hydraulic pump, said swing hydraulic motor being provided with mechanical brake means having a brake release cylinder adapted to release the rotary shaft of said motor from the braking by the mechanical brake means by supply of a hydraulic fluid to the brake release cylinder, wherein: said apparatus comprises an auxiliary hydraulic pump, and control circuit means connected to said auxiliary hydraulic pump, said brake release cylinder and a reservoir for control of fluid communication therebetween, said control circuit being arranged such that when all of said operation means for said directional control valves are not actuated or when only the operation means for said left and right travel directional control valves are actuated, said brake release cylinder is brought into communication with the reservoir, while when at least one of the operation means for said swing directional control valve and the operation means for the other directional control valves other than at least said left and right travel directional control valve in actuated, said brake release cylinder is brought into communication with said auxiliary hydraulic pump.

DETAILED DESCRIPTION OF THE INVENTION

The brake circuit apparatus of the invention will now be described with reference to the drawings showing its preferred embodiments.

Figure 2:
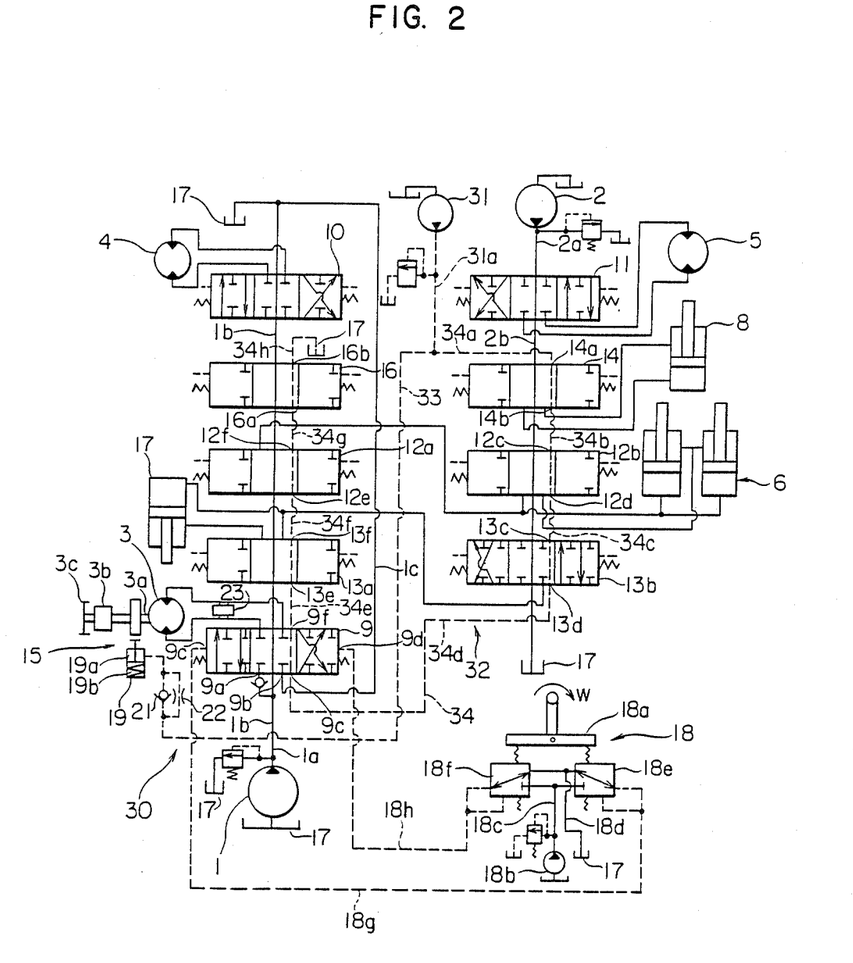
FIG. 2 is a schematic hydraulic circuit showing the brake circuit apparatus for the swing hydraulic motor according to a preferred embodiment of the invention.

FIG. 2 shows a first embodiment of the invention, wherein the same parts as those of the conventional apparatus previously described in conjunction with FIG. 1 are identified by the same reference characters, and explanation of these parts is omitted for brevity.

In FIG. 2, the brake circuit apparatus for hydraulic motor according to the invention is generally indicated by the reference numeral 30 which comprises an auxiliary hydraulic pump 31 and a control circuit 32 connected to the brake release cylinder 19 and the reservoir 17 for control of fluid communication therebetween. The control circuit 32 includes a first line 33 connected between a hydraulic fluid supply line 31a for receiving the fluid supplied from the auxiliary pump, and a second line 34 connected between the supply line 31a and the reservoir 17. In the illustrated embodiment, the first line 33 is connected directly to the cylinder chamber 19a of the brake release cylinder 19, with the check valve 21 and restrictor 22 being connected in parallel therein as in the conventional circuit apparatus. The second line 34 includes a line section 34a connected between the supply line 31a and the pilot inlet port 14a of the directional control valve 14, line sections 34b, 34c, 34d, 34e, 34f and 34g connected between the pilot outlet ports 14b, 12d, 13d, 9f, 13f and 12f of the directional control valves 14, 12b, 13b, 9, 13a and 12a and the pilot inlet ports 12c, 13c, 9e, 13e, 12e and 16a of the directional control valves 12b, 13b, 9, 13a, 12a and 16, respectively, and a further line section 34h connected between the pilot outlet port 16b of the valve 16 and the reservoir 17. Thus, the second line 34 is connected to the tank 17 passing through the control valve 9 for swing, control valves 12a, 12b, 13a, 13b and 14 for front attachments, and the provisional valve 16. The directional control valves 12a, 12b, 13a and 13b are constructed such that when they are in neutral position, they establish fluid communication between the respective pilot inlet ports and the respective pilot outlet ports, thereby maintaining fluid communication between the line sections of the second line, and when they are even slightly shifted from the neutral position, such fluid communication are interrupted, thereby interrupting the fluid communication betwee the line sections.

In the brake circuit apparatus 30 arranged in the above manner, when either one of the operation devices including that 18 for the swing control valve 9 is not actuated and thus all of the directional control valves are in neutral position, the hydraulic fluid from the pump 1 flows through the supply line 1a, center-bypass line 1b and directional control valves 9, 13a, 12a, 16 and 10 so as to be drained into the reservoir 17, while the hydraulic fluid from the pump 2 flows through the supply line 2a, center-bypass lines 2b and directional control valves 11, 14, 12b and 13b so as to be drained into the reservoir 17. At the same time, the hydraulic fluid from the auxiliary pump 31 flows through the supply line 31a, second line 34 and directional control valves 9, 12a–14, 16 so as to be drained into the reservoir 17, since those control valves are positioned with their respective pilot inlet ports and pilot outlet ports being communicated with each other. Thus no fluid pressure is developed in the first line 33 and no fluid from the auxiliary pump 31 is supplied to the cylinder chamber 19a of the brake release cylinder 19, so that the rotary shaft 3a of the hydraulic motor 3 remains braked by the mechanical brake device 15.

Assuming, that the control lever 18a of the operation device 18 for the swing motor 3 is turned in a direction W, a pilot pressure from the pilot pump 18b is transmitted to the pilot line 18g through the supply line 18c and pilot valve 18e, and then to the pilot-operated section 9c of the swing control valve 9, thereby shifting the valve 9 to the left side working position. Since the directional control valve 9 is configurated, as described earlier, that the communication between the pilot inlet and outlet ports 9e and 9f are interrupted even upon a slight shifting from the neutral position, the communication between the line sections 34d and 34e of the second line 34 is interrupted in the early stage of the above shifting motion of the valve 9. Hence, substantially simultaneously with the start of shifting motion of the valve 9, a fluid pressure is developed in the first line 33, and fluid from the auxiliary pump 31 is supplied to the chamber 19a of the brake release cylinder 19 through the supply line 31a, first line 33 and check valve 21, thereby releasing the rotary shaft 3a of the swing motor 3 from the braking by the mechanical brake device 15. As the valve 9 then proceeds with further shifting, the hydraulic fluid from the pump 1 flows into the valve 9 through the supply line 1a, center-bypass line 1b and input port 9a, and thus the fluid is supplied to the brake-released motor 3 for rotation thereof before the hydraulic fluid is returned to the valve 9 and flows from the outlet port 9b through the return line 10 into the reservoir 17.

When the control lever 18a of the operation device 18 is restored to the neutral position, the pilot-operated section 9c of the directional control valve 9 is again brought into communication with the reservoir 17, the valve 9 thus being returned to the neutral position. Accordingly, the pump 1 is drained into the reservoir 17 through the center-bypass line 1b, and the return fluid from the motor is blocked by the valve 9, thereby the motor 3 being hydraulically braked. Simultaneously, the inlet and outlet ports 9e and 9f of the valve 9 are again communicated with each other while the second line 34 also being communicated with the reservoir 17 as a result of fluid communication between its sections 34d and 34e, so that the fluid from the auxiliary pump 31 is drained through the second line 34 into the reservoir 17. This reduces a pressure in the first line 33 and thus a pressure in the chamber 19a of the brake release cylinder 19, so that the mechanical brake device 15 is actuated so as to brake the shaft 3a of the hydraulic motor 3. Since the fluid in the cylinder chamber 19a is forced to pass through the restrictor 22 because of blocking by the check valve 21, so that the internal pressure within the chamber 19a gradually reduces. Thus, the rotary shaft 3a of the motor 3 is braked and locked by the mechanical brake device 15 after the motor 3 completely stops its rotation by hydraulic braking described earlier.

It is to be noted that even when the control lever 18a is actuated in a direction opposite to W, the same action as described above will be effected, only that the motor rotates in the opposite direction.

When at least one of those operation devices, not shown, for the directional control valves 12a-14, 16, or, the control lever of the arm operation device, for example, is actuated, a pilot pressure is caused to act on at least one of the control valve 13a and 13b to shift it, e.g., the valve 13a, into one of the working positions in like manner as described in conjunction with the device 18. As having described in respect to the swing control valve 9, fluid communication through the second line 34 is interrupted between its sections 34e and 34f to thereby develop pressure in the first line 33. The fluid from the auxiliary pump 31 is thus supplied to the chamber 19a of the brake release cylinder 19 through the first line 33, and releases the rotary shaft 3a of the swing motor 3 from the braking by the mechanical brake device 15 while the fluid from the pump 1 is supplied to the arm cylinder 7 through the control valve 13a. Thus, even if any swing force acts on the swing frame of the machine during excavating operation, the force is entirely transmitted to the hydraulic motor 3 through the driving gear 3c, speed reducer 3b and rotary shaft 3a, so that the reaction of the swing force is borne solely by a relief torque caused by the relief valve unit 23 due to compulsory rotation of the motor 3. Therefore, there will be no occurrence of an excessive load being applied to the speed reducer 3b. As the arm control lever is returned to the neutral position, the directional control valve 13a is also returned to the neutral position, so that the arm cylinder 7 stops its operation, and the rotary shaft 3a of the motor 3 is again braked and locked by the mechanical brake device 15, as in the case of the swing directional control valve 9.

The above operation described in conjunction with actuation of the arm operation device can substantially equally be applied to actuation of any one of the other operation devices for the boom control valves 12a and 12b, bucket control valve 14 and provisonal control valve 16, and the rotary shaft 3a of the swing motor 3 is released from the braking by the mechanical brake device 15. Accordingly, even if there occurs a situation of operating the front attachments alone wherein a swing force acts upon the swing frame of the machine, the result is that the reaction of the force will be borne solely by a relief torque provided by the relief valve unit 23 for the swing motor 3. Thus, it is possible to prolong the durability of the speed reducer because of the risk of an excessive load being imparted thereto.

When the operation devices, not shown, for the respective left and right travel hydraulic motors 4 and 5 are actuated, the corresponding directional control valves 10 and 11 are shifted to either one of the working positions to thereby allow fluid from the pumps 1 and 2 to be supplied to the motors 4 and 5 for rotation thereof, respectively. In this case, however, due to the fact that the second line 34 of the control circuit 32 is not associated with the control valves 10 and 11, the situation remains the same in that the second line 34 is kept in communication with the reservoir 17, and the shaft 3a of the swing motor 3 is kept in a braked condition and is locked by the mechanical brake device 15. Thus, it is possible, during travel of the hydraulic excavator, to securely lock the swing frame in a predetermined position, without the risks of the swing frame being rotated by a swing force which otherwise would occurs when the steering is turned. Thus, the operation is free from danger.

The advantages achieved by this embodiment are summarized as follows. Firstly, since the brake release cylinder 19 is adapted to be supplied with fluid by use of shifting motion of the directional control valve, it is possible, upon actuation of the swing motor, to release it from the braking by the mechanical brake device in reliable manner before the motor starts its rotation. Thus, when starting the swing motor, there will be no risk of incurring delay in release of the braking by the mechanical brake device. As already apparent from the above description, it is arranged that the braking of the swing motor by the device 15 is released when not only the swing motor 3 but also the boom cylinder 6, arm cylinder 7 and bucket cylinder 8 are actuated for earth-moving operation with only the front attachments. Hence, the reaction of a swing force occurring in such operations is borne by a relief torque of the relief valve unit for the motor, and as mentioned earlier, this prevents the speed reducer 3b from being applied with an excessive load and prolongs its durability. This effect is further assured by the fluid supply to the brake cylinder 19 effected by use of the shifting motion of the directional control valve. When only the left and right travel motors 4 and 5 are actuated, the swing motor is not released from the braking by the mechanical brake device, so that, during travel of the excavator, there will be not risk of the swing frame being rotated under the influence of a swing force occurring when the steering is turned, and thus safety is secured.

Since, the brake circuit apparatus 30 is entirely hydraulically separated from the respective pilot circuits of the operation devices, there will be no interaction caused from fluctuation in fluid pressure between the former and latter members, so that the supply of sufficient fluid is secured to these members. For example, in the pilot system for the operation device 18, it is possible to effect prompt transmission of fluid pressure from the pilot pump 18b to the pilot-operated sections 9c and 9d of the control valve 9, thus enabling improvements on the responsiveness of the valve operation and hence the responsiveness of the hydraulic motor or cylinder operation. Since a sufficient volume of hydraulic fluid is supplied from the auxiliary pump 31 to the brake release cylinder 19, it is also possible to improve the responsiveness of the mechanical brake device operation, thus improving the maneuverability of the excavator to a greater extent. In addition, due to the fact that a sufficient volume of hydraulic fluid is supplied to the brake release cylinder 19, it is possible to reduce the size of the cylinder chamber 19a, thereby attaining a compact size of the mechanical brake device.

Figure 3:
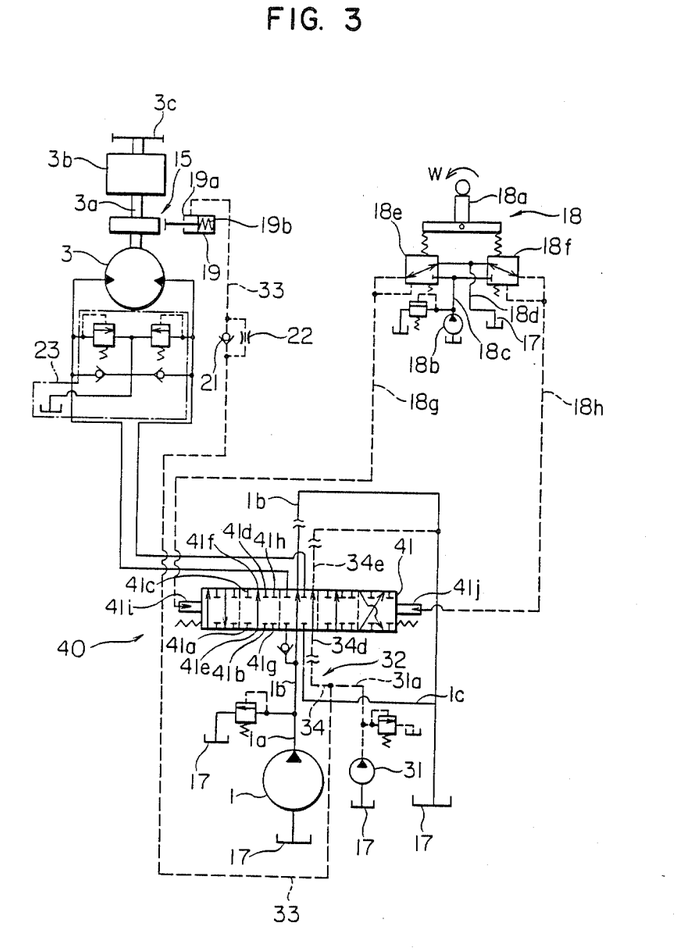
FIG. 3 is a fragmentary schematic hydraulic circuit showing the modified directional control valve in the brake circuit apparatus shown in FIG. 2.

FIG. 3 shows a partly modified embodiment of that shown in FIG. 2, wherein like parts are identified by like reference characters as used in FIG. 2, with a certain portion thereof being omitted. This modified brake circuit apparatus is generally indicated by the reference numeral 40, which differs from the FIG. 2 embodiment in respect of the structure of the directional control valve. That is, the brake circuit apparatus 40 employs a directional control valve 41 for swing of the type having intermediate transient positions between the neutral position and the left side forward and right side reverse positions, respectively. In these transient positions, with respect to main ports for supply and drain of fluid between the main pump 1, reservoir 17 and swing hydraulic motor 3, fluid communication between an inlet port 41a for fluid supply and an outlet port 41b for fluid drain and outlet and inlet ports 41c, 41d on the motor 3 side are interrupted while an inlet port 41e and an outlet port 41f for the center-bypass line 1b are brought into communication with each other, and with respect to ports for the second line 34 of the brake circuit apparatus, i.e. a pilot inlet port 41g and a pilot outlet port 41h, fluid communication there-between is interrupted as in the working positions. The control valve 41 is thus designed to interrupt fluid communication through the second line 34 between the line sections 34d and 34e thereof but not cause rotation of the swing hydraulic motor 3 when it is in the transient position. Pilot lines 18g and 18h for the operation device 18 are connected to pilot-operated sections 41i and 41j respectively.

In this modified embodiment, the apparatus operates as follows. When the control lever 18a of the operation device 18 is actuated in the direction W shown in FIG. 3, a pilot pressure is caused to act on the pilot-operated section 41i of the directional control valve 41, and the valve 41 is shifted to the left side working position passing through the transient position. When the valve passes through this transient position, it interrupts communication between the pilot inlet port 41g and the pilot outlet port 41h, so that fluid from the pump 31 is supplied to the first line 33 through the supply line 31a and flows into the chamber 19a of the brake release cylinder 19 through the check valve 21, and therefore the shaft 3a of the motor 3 is released from the braking by the mechanical brake device 15. Meanwhile, since a hydraulic fluid from the pump 1 is caused to flow through the line 1a, inlet and outlet ports 41e, 41f of the valve 41 for center-bypass, and center-bypass line 1b into the reservoir 17, thus remaining the motor 3 inactivated. When the valve 41 reaches its working position, fluid from the main pump 1 is caused to flow through the line 1a, line 1b, and inlet port 41a and outlet port 41c of the valve 41 into the hydraulic motor 3 while the return fluid from the motor 3 is caused to drain through inlet and outlet ports 41d and 41b of the valve 41 and the return line 1c into the reversior 17, with fluid communication between the pilot inlet and outlet ports 41g, 41h being interrupted and thus the braking by the brake release cylinder 19 being released. Hence, the motor 3 is rotated.

When the control lever 18a is restored to its neutral position, the control valve 41 is shifted from the left side working position to the neutral position through the transient position. In this case, when the valve 41 passes through the transient position, fluid communication between the ports 41a, 41c and 41b, 41d fluid communication between the ports are interrupted, respectively, and the ports 41e and 41f being brought into communication with each other, so that the hydraulic fluid from the pump 1 is drained into the reservoir while the motor 3 is hydraulically braked and stops. When the valve 41 reaches its neutral position, the pilot inlet and outlet ports 41g, 41h are brought into communication with each other, thereby communicating between the line sections 34d, 34e of the second line 34, so that the hydraulic fluid from the pump 31 is drained into the reservoir 17 while lowering the pressure in the first line 33 and thus in the chamber 19a of the brake release cylinder 19. At this time, since the hydraulic fluid in the chamber 19a is blocked by the check valve 21, and is allowed to flow through the restrictor 22, the pressure of the fluid in the chamber 19a is caused to reduce gradually. Thus, it is assured that only after the motor 3 is completely stopped, the shaft 3a is braked by the mechanical brake device 15. The above described operation and effect are equally applied also to the case where the control lever 18a is actuated in the opposite direction to W in FIG. 3 in an attempt to reverse the rotation of the motor 3.

According to the modified embodiment, therefore, wherein a particular directional control valve having transient positions is employed as a valve 4 for swing, it is secured that when the operation device 18 for swing is actuated, the rotary shaft 3a is released from the braking by the mechanical brake device 15 in more positive manner before the hydraulic motor 3 starts its rotation, thereby preventing occurrence of trailing of the hydraulic motor by the mechanical brake device 15 due to an incomplete release of the braking upon starting of the hydraulic motor, and thus prolonging the span of life of the mechanical brake device 15.

Though the valve 41 has been described as being desired such that in the transient position, fluid communication between the inlet and outlet ports 41a, 41b and the outlet and inlet ports 41c, 41d is interrupted while the inlet and outlet ports 41e, 41f for center-bypass are brought into communication with each other, the arrangement may alternatively be selected otherwise provided that the swing motor 3 is not caused to rotate. For example, it may be arranged that at least one of the communications between the ports 41a, 41c and between the ports 41b, 41d is established.

In the modified embodiment in FIG. 3, the swing valve 41 has been solely described as of the type having particular transient positions as described above, however the other directional control valves 9, 12a-14, 16 may be of such particular type, excepting at least left and right travel valves 10, 11, so that even when the operation devices for front attachments are actuated, it is possible to effect more positive release of the braking of the shaft 3a of the swing motor 3 before commencement of the operation of the front attachments, thus more effectively preventing the speed reducer 3b from being applied with an excessive load.

Figure 4:
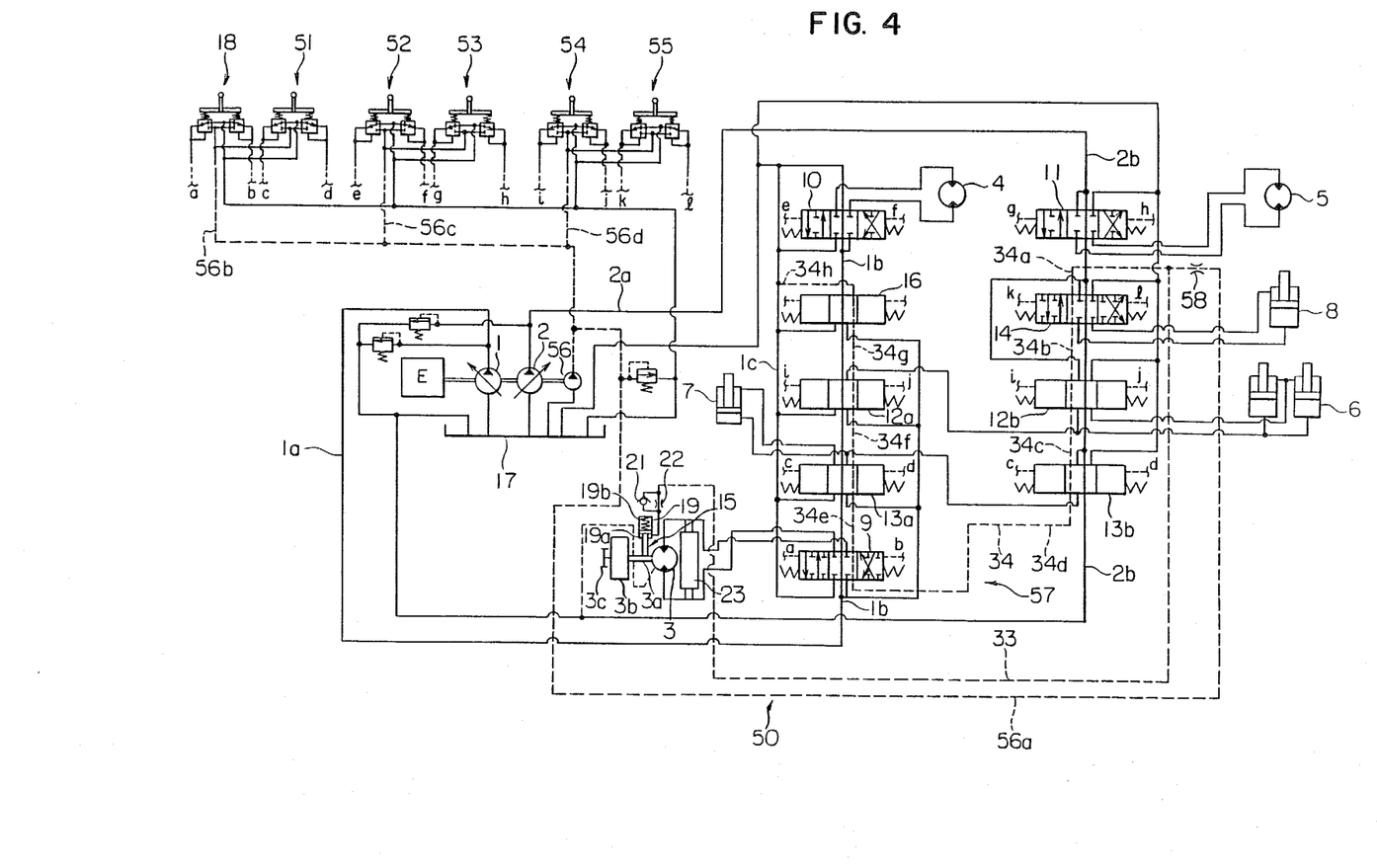
FIG. 4 is a schematic hydraulic circuit showing the brake circuit apparatus according to a second embodiment of the invention.

FIG. 4 shows a second embodiment of the invention, wherein the brake circuit apparatus of the invention is generally indicated by the reference character 50 and like parts are identified by the same reference character compared with FIG. 2. In FIG. 4, however, there are shown operation devices for arm, left and right travel, boom and bucket indicated at 51, 52, 53, 54 and 55, respectively, that have not been shown in FIG. 2. These operation devices have respective pilot lines, indicated by the reference characters a to l, connected to the associated pilot-operated sections of the directional control valves 9 to 14. The brake circuit apparatus 50 includes an auxiliary pump and pilot pump 56 and a control circuit 57 connected to the auxiliary pump 56, brake release cylinder 19 and reservoir 17 for control of communication therebetween. In this control circuit 57, there is provided a restrictor 58 in the downstream portion of a hydraulic fluid supply line 56a for receiving a hydraulic fluid supplied from the auxiliary pump 56, the first and second lines 33, 34 being connected to the line 56a in a further downstream portion with respect to the restrictor 58. It is further arranged that pilot pressure lines 56b, 56c, 56d are branched from the pressure fluid supply line 56a between the auxiliary pump 56 and the restrictor 58, through which lines 56b, 56c, 56d, a pilot pressure developed by the restrictor 58 are applied as a pressure of hydraulic source to the inlets of the pilot valves of the operation devices 18, 51 to 55 for the control valves 9–14, 15.

In this embodiment, the auxiliary pump 56 is used of the type to be able to develop a high discharge pressure with setting of a relief pressure at a high level, so that the pressure developed in the supply line 56a by the restrictor 58 is set at a level higher than the pressure developed in the first line 33 by the auxiliary pump 31 upon interruption of communication through the second line 34 in the embodiment shown in FIG. 2. The brake release cylinder 19 is of the compact size having a smaller hydraulic acting surface area so that the braking by the mechanical brake device 15 can be released with even a small volume of hydraulic fluid supplied to the cylinder chamber 19a. The restrictor 58 has its orifice size which is small enough to develop the above-mentioned high pressure in the line 56a but is sufficient to allow a flow rate of fluid enough to actuate the brake release cylinder 19 to pass therethrough.

In this embodiment, when at least one of the operation devices 18, 51, 54, 55 for swing and front attachments is operated, the second line 34 of the control circuit 57 is interrupted of its communication with the reservoir 17 in the early stage of shifting motion of the directional control valve, as in the case of FIG. 2 embodiment, and since the pressure can effect a quick transmission disregarding the presence of the restrictor 58, the high pressure in the line 56a is almost instantaneously transmitted to the chamber 19a of the brake release cylinder 19, where a corresponding pressure is developed, while the above-mentioned orifice setting of the restrictor 58 and structure of the brake release cylinder 19 permit the cylinder chamber 19a to be instantaneously furnished with a volume of hydraulic fluid enough to actuate the brake release cylinder 19 from the auxiliary pump 56 through the line 56a, restrictor 58, first line 33 and check valve 21, so that the rotary shaft 3a of the swing motor 3 is released from the braking by the mechanical brake device 15. Then, a hydraulic fluid from at least one of the pumps 1 and 2 is supplied through the control valve, as operated to the associated motor or cylinder for activation thereof. When the operation device is restored to its neutral position, the second line 24 is again brought into communication with the reservoir 17, and the first line 33 also shows a pressure reduction, so that the fluid within the chamber 19a of the brake release cylinder 19 is expelled gradually through the restrictor 22 with the orifice of the small size, and after the hydraulic motor or cylinder as actuvated caused to stop its operation, the shaft 3a of the swing motor 3 is again braked by the mechanical brake device 15. Thus, this embodiment assures substantially similar effects as those obtained by the FIG. 2 embodiment.

Further, in this embodiment, when any one of the operation devices is operated, the same pressure as that in the fluid supply line 56a is at all times developed in the lines 56b, 56c and 56d, so that the pilot valve of the operation device as operated is furnished with hydraulic fluid of that pressure from the auxiliary pump 56, thereby allowing the pressure to act on the pilot-operated section of the associated control valve. According to this embodiment, therefore, there will be eliminated the necessity of providing the pilot pump 18b for exclusive use for the operation devices which has been necessitated in FIG. 2 embodiment. This embodiment thus mainfests and additional effect of cost reduction.

Figure 5:
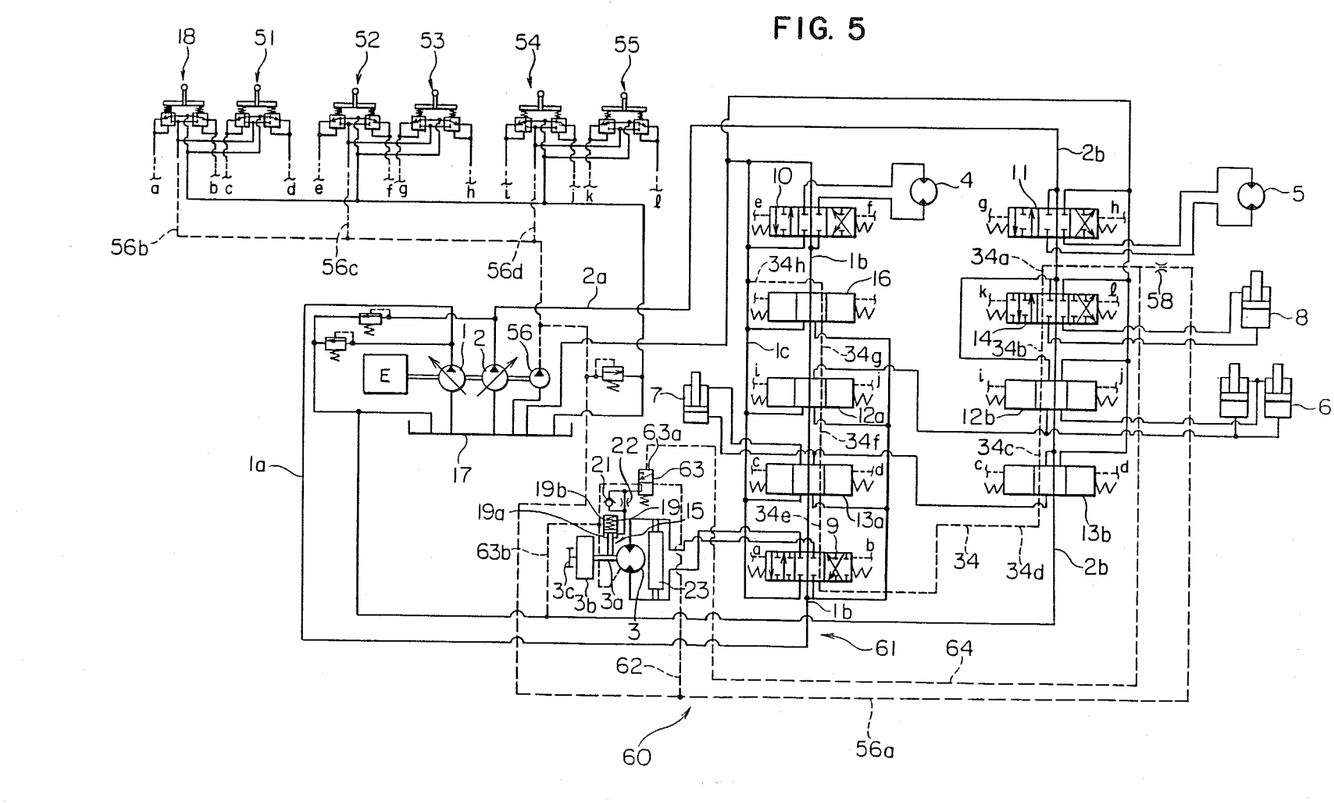
FIG. 5 is a schematic hydraulic circuit showing the brake circuit apparatus according to a third embodiment of the invention.

FIG. 5 shows a still further embodiment of the invention, wherein the brake circuit apparatus of the invention is generally indicated by the reference character 60, and like parts are identified by like characters as compared with FIGS. 2 and 4. The brake circuit apparatus 60 includes a control circuit 61 wherein a first line 62 is connected to the hydraulic fluid supply line 56a between the auxiliary pump 56 and the restrictor 58 while being connected to the cylinder chamber 19a of the brake release cylinder 19 through an on-off valve 63. The on-off valve 63 is provided with a pilot-operated section 63a connected to a portion of the line 56a downstream of the restrictor 58 through a pilot line 64. When a pilot pressure does not act on the pilot-operated section 63a, the on-off valve 63 takes a closed position in which fluid communication between the first line 62 and the chamber 19a of the brake release cylinder 19 is interrupted, and when the pilot pressure acts on the pilot-operated section 63a, it takes an open position in which the first line 62 is brought into communication with the cylinder chamber 19a. In this embodiment, the orifice size of the restrictor 58 is selected to develop an ordinary pilot pressure in the pressure fluid supply line 56a, and the sizes of the orifice of the restrictor 22 and the brake release cylinder 19a are of the ordinary types.

According to this embodiment, when the operation of at least one of the swing and front attachment operation devices 18, 51, 54, 55 interrupts the communication between the second line 34 and the reservoir 17 in the early stage of the shifting motion of the corresponding directional control valve, since the pressure is immediately transmitted irrespective of the presence of the restrictor 58, the pressure in the supply line 56a is promptly transmitted to the pilot-operated section 63a of the stop valve 63 through the restrictor 58 and pilot line 64, thereby shifting the valve to its open position. On the other hand, since the first line 62 is at all times furnished with a hydraulic fluid of the same pressure as that in the fluid supply line 56a, the pressure is immediately transmitted to the chamber 19a of the brake release cylinder 19 to cause the hydraulic fluid from the auxiliary pump 56 to be supplied thereto, so that the shaft 3a of the swing motor 3 is released from the braking by the mechanical brake device 15 before the hydraulic motor or cylinder is activated. When the operation device is restored to its neutral position, the second line 34 is again brought into communication with the reservoir 17, thereby lowering the pressure in the pilot line 64 to restore the on-off valve 63 to its closed position. Hence, the chamber 19a is communicated through the return line 63b with the reservoir 17, so that the hydraulic fluid within the chamber is gradually expelled through the restrictor 22. Thus, the swing motor 3 is again braked by the mechanical brake device 15 after the hydraulic motor or cylinder as actuated is caused to stop its operation. Like the FIG. 4 embodiment, the provision of the restrictor 58 makes it possible to use the hydraulic fluid from the auxiliary pump 56 as a hydraulic fluid source for the operation devices, thus despensing with pilot pumps for exclusive use.

According to this embodiment, the first line 62 is connected to the fluid supply line 56a between the pump 56 and the restrictor 58 so as to introduce the pressure at a portion very close to the brake release cylinder 19, while the pressure developed by the interruption of fluid communication between the second line and the reservoir 17 is transmitted to the pilot-operated section 63a of the on-off valve 63 for which a small flow rate suffices. Thus, there will be provided a more improved responsiveness the mechanical brake device 15 to the shifting action motion of the directional control valve, as compared with the FIG. 4 embodiment.

In either one of the embodiments shown in FIGS. 4 and 5, it is possible to employ such a special construction of direction control valve having the transient positions as described in connection with the FIG. 2 embodiment, thereby enabling more positive release of the braking by the mechanical brake device 15 prior to the activation of the hydraulic motor or cylinder.

As apparent from the foregoing, according to the brake circuit apparatus for hydraulic motor incorporating a particular control circuit, it is possible to effect positive release of the braking by the mechanical brake device prior to the start of the hydraulic motor due to the fact that the brake release cylinder can be furnished with a sufficient flow rate of hydraulic fluid prior to the supply of fluid to the motor, thereby preventing occurrence of trailing of the rotary shaft of the motor by the mechanical brake device upon starting of the motor, thereby improving the serviceable life span of the mechanical brake device as well as the maneuability in the excavating operation.

Also, when the excavating operation involving only the actuation of the front attachments is performed in the construction machine such as a hydraulic excavator, the brake release cylinder is furnished with a hydraulic fluid so that the rotary shaft of the swing motor is released from the braked condition by the mechanical brake device, and therefore even if a swing force is applied to the swing frame during such excavating operation, the reaction of such force will be borne solely by a relief torque caused by the relief valve unit for the swing motor. This avoids occurrence of an excessive load applied to the speed reducer positioned between the swing frame and the swing hydraulic motor, thereby prolonging its span of life.

What is claimed is:

1. Brake circuit apparatus for a hydraulic motor in a hydraulic circuit system including at least one main hydraulic pump, a hydraulic motor driven by a hydraulic fluid supplied from said main pump and having a rotary shaft, and a directional control valve actuated by operation means for control of flow rate and flow direction of the hydraulic fluid supplied to said hydraulic motor from said main hydraulic pump, said hydraulic motor being provided with mechanical brake means having a brake release cylinder adapted to release the rotary shaft of the motor from the braking by the mechanical brake means by supply of a hydraulic fluid to the brake release chamber, wherein: said apparatus comprises an auxiliary pump, and control circuit means connected to said auxiliary pump, said brake release cylinder and a reservoir for control of fluid communication therebetween, said control circuit means having a hydraulic fluid supply line for receiving a hydraulic fluid supplied from said auxiliary hydraulic pump, a first line connected between said hydraulic fluid supply line and said brake release cylinder, and a second line connected between said hydraulic fluid supply line and said reservoir, said second line being associated with said directional control valve such that when the control valve is in a neutral position, said hydraulic fluid supply line is brought into communication with said reservoir to thereby disable a hydraulic fluid from said hydraulic fluid supply line from being supplied to said brake release cylinder through said first line, while when said directional control valve is actuated, said communication is interrupted to thereby enable the hydraulic fluid from said hydraulic fluid supply line to be supplied to said brake release cylinder through said first line.

2. Brake circuit apparatus according to claim 1, wherein said second line leads to said reservoir passing through said directional control valve, and said directional control valve maintains communication through said second line when said valve is in a neutral position while said communication is interrupted when said valve is shifted from the neutral position.

3. Brake circuit apparatus according to claim 1, wherein said first line is connected directly to said brake release cylinder.

4. Brake circuit apparatus according to claim 3, wherein said hydraulic fluid supply line has a restrictor connected therein and is connected, upstream of said restrictor, to a pilot hydraulic fluid supply line for transmitting a pressure developed in said first-mentioned hydraulic fluid supply line by said restrictor to said operation means for said directional control valve, said first and second lines both being connected to said first-mentioned hydraulic fluid supply line downstream of said restrictor.

5. Brake circuit apparatus according to claim 1, wherein said hydraulic fluid supply line has a restrictor connected therein and is connected, upstream of said restrictor, to a pilot hydraulic fluid supply line for transmitting a pressure developed in said first-mentioned hydraulic fluid supply line to said operation means for said control directronal valve, said first line being connected to said first-mentioned hydraulic fluid supply line upstream of said restrictor and connected to said brake release cylinder through an on-off valve and said second line being connected to said first-mentioned hydraulic fluid supply line downstream of said restrictor, and a pilot line is provided to connect a portion of said first-mentioned hydraulic fluid supply line downstream of said restrictor to a pilot-operated section of said on-off valve.

6. Brake circuit apparatus according to claim 1, wherein said directional control valve has, between the neutral position thereof and each of forward and reverse working positions thereof, intermediate transient positions where said communication of second line with the reservoir is interrupted while said hydraulic motor is not allowed to rotate.

7. Brake circuit apparatus for a hydraulic motor for a swing in a hydraulic circuit system of a construction machine including at least one main hydraulic pump, a hydraulic motor for swing, hydraulic motors for left and right travels, and hydraulic cylinders for front attachments driven by hydraulic fluid supplied from said main pump, said swing motor having a rotary shaft, and directional control valves for said hydraulic motors and cylinders actuated by respective operation means for control of flow rate and flow direction of the hydraylic fluid supplied to said hydraulic motors and cylinders from said main hydraulic pump, said swing hydraulic motor being provided with mechanical brake means having a brake release cylinder adapted to release the rotary shaft of said motor from the braking by the mechanical brake means by supply of a hydraulic fluid to the brake release cylinder wherein: said apparatus comprises an auxiliary hydraulic pump, and control circuit means connected to said auxiliary hydraulic pump, said brake release cylinder and a reservoir for control of fluid communication therebetween, said control circuit being arranged such that when all of said operation means for said directional control valves are not actuated or when only the operation means for said left and right travel directional control valves are actuated, said brake release cylinder is brought into communmication with the reservoir, while when at least one of the operation means for said swing directional control valve and the operation means for the other directional control valves other than at least said left and right travel directional control valve is actuated, said brake release cylinder is brought into communication with said auxiliary hydraulic pump.

8. Brake circuit apparatus according to claim 7, wherein said control circuit means includes, a hydraulic fluid supply line for receiving a hydraulic fluid supplied from said auxiliary hydraulic pump a first line connected between said hydraulic fluid supply line and said brake release cylinder, and a second line connected between said hydraulic fluid supply line and the reservoir, said second line being associated with said swing directional control valve and the other directional control valves other than at least said left and right travel directional control valves such that when all of said valves are in neutral positions, said second line is brought into communication with said reservoir, while when at least one of said valves is actuated, said communication is interrupted.

9. Brake circuit apparatus according to claim 8, wherein said second line leads to said reservoir passing through said swing directional control valve and the other directional control valves other than at least said left and right travel directional control valves, and said directional control valves each maintain communication through said second line when said valves are in the neutral positions while said communication is interrupted when said valves are shifted from the neutral positions.

10. Brake circuit apparatus according to claim 8, wherein said first line is connected directly to said brake release cylinder.

11. Brake circuit apparatus according to claim 10, wherein said hydraulic fluid supply line has a restrictor connected therein and is connected, upstream of said restrictor, to pilot hydraulic fluid supply lines for transmitting a pressure developed in said first-mentioned hydraulic fluid supply line by said restrictor to the respective operation means for said directional control valves, said first and second lines both being connected to said first-mentioned hydraulic fluid supply line downstream of said restrictor.

12. Brake circuit apparatus according to claim 8, wherein said hydraulic fluid supply line has a restrictor connected therein and is connected, upstream of said restrictor, to pilot hydraulic fluid supply lines for transmitting a pressure developed in said first-mentioned hydraulic fluid supply line by said restrictor to said respective operation means for said directional control valves, said first line section being connected to said first-mentioned hydraulic fluid supply line upstream of said restrictor and connected to said brake release cylinder through an on-off valve and said second line being connected to said first-mentioned hydraulic fluid supply line downstream of said restrictor, and a pilot line is provided to connect a portion of said first-mentioned hydraulic fluid supply line downstream of said restrictor to a pilot-operated section of said on-off valve.

13. Brake circuit apparatus according to claim 8, wherein said swing directional control valve has, between the neutral position and each of the forward and reverse working positions, intermediate transient positions where said communication of the second line with the reservoir is interrupted while said swing hydraulic motor is not allowed to rotate.

14. Brake circuit apparatus according to claim 8, wherein said swing directional control valve and the other directional control valves other than at least said left and right trave directional control valves each have, between the respective neutral positions and each of the forward and reverse working positions respective intermediate transient positions where said communication of the second line with the reservoir is interrupted while the associated hydraulic motor and hydraulic cylinders are not allowed to operate.

* * * * *